(12) United States Patent
Udd et al.

(10) Patent No.: US 10,634,200 B2
(45) Date of Patent: Apr. 28, 2020

(54) CONTROL OF A POWERTRAIN BACKLASH

(71) Applicant: SCANIA CV AB, Södertälje (SE)

(72) Inventors: Jonas Udd, Stockholm (SE); Anders Kjell, Ekerö (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/091,367

(22) PCT Filed: Apr. 3, 2017

(86) PCT No.: PCT/SE2017/050331
§ 371 (c)(1),
(2) Date: Oct. 4, 2018

(87) PCT Pub. No.: WO2017/180043
PCT Pub. Date: Oct. 19, 2017

(65) Prior Publication Data
US 2019/0128345 A1 May 2, 2019

(30) Foreign Application Priority Data
Apr. 12, 2016 (SE) ...................... 1650490

(51) Int. Cl.
F16D 48/06 (2006.01)
B60W 30/20 (2006.01)
(Continued)

(52) U.S. Cl.
CPC ............ F16D 48/06 (2013.01); B60W 10/02 (2013.01); B60W 10/10 (2013.01); B60W 10/11 (2013.01);
(Continued)

(58) Field of Classification Search
None
See application file for complete search history.

(56) References Cited

U.S. PATENT DOCUMENTS 8,239,113 B2 * 8/2012 Doering .............. F02D 41/0002
701/1
8,332,111 B2 * 12/2012 McDonnell ........... B60W 10/02
701/68
(Continued)

FOREIGN PATENT DOCUMENTS

DE 102013220626 A1 4/2015
EP 2949907 A1 12/2015
(Continued)

OTHER PUBLICATIONS

International Search Report for International Patent Application No. PCT/SE2017/050331 dated May 30, 2017.
(Continued)

Primary Examiner — Dirk Wright
(74) Attorney, Agent, or Firm — Moore & Van Allen PLLC; W. Kevin Ransom

(57) ABSTRACT

A method and a system for controlling a backlash of a powertrain included in a vehicle in connection with a gear shifting operation is presented. The method comprises: controlling, in connection with a first gear shifting operation, a clutch included in the powertrain to a slipping position, in which slipping position the clutch transfers a slipping torque that is less than a torque being transferred in a closed position for the clutch; analyzing a change of a rotational speed for an input shaft of a gearbox included in the powertrain; determining a position for the clutch, for which position the change of the rotational speed has a value corresponding to a backlash torque, the backlash torque having a predetermined value for eliminating the backlash; and utilizing the determined clutch position for controlling the clutch in connection with a second subsequent gear shifting operation.

14 Claims, 6 Drawing Sheets

(51) Int. Cl.

| | |
|---|---|
| *B60W 10/02* | (2006.01) |
| *B60W 30/184* | (2012.01) |
| *B60W 40/12* | (2012.01) |
| *B60W 10/196* | (2012.01) |
| *B60W 10/11* | (2012.01) |
| *B60W 30/19* | (2012.01) |
| *B60W 10/10* | (2012.01) |
| *F16H 59/36* | (2006.01) |
| *F16H 61/04* | (2006.01) |

(52) U.S. Cl.
CPC ........ *B60W 10/196* (2013.01); *B60W 30/184* (2013.01); *B60W 30/19* (2013.01); *B60W 30/20* (2013.01); *B60W 40/12* (2013.01); *B60W 2510/0208* (2013.01); *B60W 2510/0241* (2013.01); *B60W 2510/0266* (2013.01); *B60W 2510/102* (2013.01); *B60W 2510/1005* (2013.01); *B60W 2510/1015* (2013.01); *B60W 2520/28* (2013.01); *B60W 2710/02* (2013.01); *B60W 2710/0644* (2013.01); *B60W 2710/1005* (2013.01); *B60W 2710/1011* (2013.01); *B60W 2710/1016* (2013.01); *F16D 2500/102* (2013.01); *F16D 2500/1045* (2013.01); *F16D 2500/10406* (2013.01); *F16D 2500/10412* (2013.01); *F16D 2500/3026* (2013.01); *F16D 2500/3067* (2013.01); *F16D 2500/30406* (2013.01); *F16D 2500/30806* (2013.01); *F16D 2500/30808* (2013.01); *F16D 2500/30816* (2013.01); *F16D 2500/3115* (2013.01); *F16D 2500/3165* (2013.01); *F16D 2500/50239* (2013.01); *F16D 2500/50646* (2013.01); *F16D 2500/7041* (2013.01); *F16D 2500/7044* (2013.01); *F16D 2500/70426* (2013.01); *F16H 2059/363* (2013.01); *F16H 2061/0411* (2013.01)

(56) References Cited

U.S. PATENT DOCUMENTS

| | | | |
|---|---|---|---|
| 8,584,545 B2* | 11/2013 | Reuschel | F16D 48/08 |
| | | | 74/409 |
| 8,793,057 B2* | 7/2014 | McDonnell | B60W 10/02 |
| | | | 701/54 |
| 9,637,108 B2* | 5/2017 | Ueno | B60W 20/00 |
| 9,869,355 B2* | 1/2018 | Pociask | B60W 10/02 |
| 2003/0054920 A1 | 3/2003 | Berger et al. | |
| 2006/0016656 A1 | 1/2006 | Kuepper | |
| 2012/0115679 A1 | 5/2012 | Doering et al. | |
| 2012/0160046 A1 | 6/2012 | Reuschel | |
| 2013/0096789 A1 | 4/2013 | McDonnell et al. | |
| 2013/0296106 A1 | 11/2013 | Dai et al. | |
| 2018/0178803 A1* | 6/2018 | Kawale | F16H 61/0213 |

FOREIGN PATENT DOCUMENTS

| | | |
|---|---|---|
| EP | 2987695 A1 | 2/2016 |
| GB | 2448671 A | 10/2008 |
| WO | 02087916 A1 | 11/2002 |
| WO | 2011003544 A2 | 1/2011 |
| WO | 2015183160 A1 | 12/2015 |

OTHER PUBLICATIONS

Written Opinion of the International Searching Authority for International Patent Application No. PCT/SE2017/050331 dated May 30, 2017.
Swedish Office Action for SE International Patent Application No. 1650490-4 dated Oct. 24, 2016.
Scania CV AB, European Application No. 17782741.7, Extended European Search Report, dated Oct. 18, 2019.

* cited by examiner

CONTROL OF A POWERTRAIN BACKLASH

CROSS-REFERENCE TO RELATED APPLICATION(S)

This application is a national stage application (filed under 35 § U.S.C. 371) of PCT/SE2017/050331, filed Apr. 3, 2017 of the same title, which, in turn claims priority to Swedish Application No. 1650490-4, filed Apr. 12, 2016 of the same title; the contents of each of which are hereby incorporated by reference.

FIELD OF THE INVENTION

The present invention relates to a method, system, and computer program product for controlling a backlash of a powertrain included in a vehicle in connection with a gear shifting operation.

BACKGROUND OF THE INVENTION

The following background description constitutes a description of the background to the present invention, which does not, however, necessarily constitute prior art.

Vehicles, such as for example cars, buses and trucks are driven forward by an engine torque produced by an engine in the vehicle. This engine torque is provided to the driving wheels of the vehicle through a powertrain/driveline/drivetrain in the vehicle. The powertrain includes a number of components, such as e.g. a clutch, a gearbox/transmission device, shafts, and a differential. The powertrain may also include other components, and is described more in detail below.

In the gearbox/transmission, different gear ratios between an input shaft and an output shaft of the gearbox can be provided. Thus, the gearbox may change the gear ratio being provided by performing a gear shifting operation, e.g. including shifting a coupling sleeve between one or more of the gear wheels interacting in the gearbox, in order to provide a desired gear ratio for the gearbox.

A conventional gear shifting operation can be described as including four phases. The first phase of the gear shifting operation includes down-ramping of a powertrain torque $T_{powertrain}$ to 0 Nm, such that the gear initially used, which is often also called the current gear, can be disengaged after the first phase.

In the second phase of the gear shifting operation, the current gear is disengaged, i.e. a gear coupling sleeve is moved out of position, such that it does not anymore couple the gear wheel of the current gear to a main/transmission shaft in the gearbox. Then, the gearbox is synchronised with a target gear. i.e. the gear which should be used after the gear shifting operation is synchronised with a rotational target $\omega_{e\_target}$ speed of the main/transmission shaft. Then, the target gear is coupled/engaged/meshed with the main/transmission shaft in the gearbox, i.e. the gear coupling sleeve is moved/changed in to a new target gear position $G_{target}$, such that the target gear wheel is coupled/engaged/meshed with the main/transmission shaft in the gearbox in the new target gear position. In other words, a new target gear ratio between an input shaft and an output shaft of the gearbox is provided by shifting one or more gear coupling sleeves in the gearbox, such that a target gear position $G_{target}$ for the gearbox is achieved. After the shifting, the target gear wheel is coupled/engaged/meshed with the main/transmission shaft in the gearbox, and the target gear ratio is provided by the gearbox.

In the third phase of the gear shifting operation, a play/backlash of the powertrain is eliminated/wound up. One or more of the components included in the powertrain may comprise a play/backlash, i.e. are coupled with a play/backlash. For example, different parts of a component, such as meshing gear wheels included e.g. in the gearbox and/or the differential, may have a play/backlash between them. In other words, the cogs/teeth of two interacting gear wheels of at least one powertrain component may at some time instances be out of contact with each other, such that no torque is transferred from the engine to the driving wheels, which is denoted play/backlash in this document. The play in the powertrain may cause oscillations in torque and/or revolutions, so called powertrain oscillations, in the vehicle when the vehicle, for example, starts moving once a torque has been requested from the engine. If the play/backlash is big/considerable, a difference $\Delta_\omega$ between a rotational speed $\omega_{shaft}$ of an input shaft of a gearbox and a rotational speed $\omega_{wheel}$ of a driving wheel of the vehicle will have time to also grow big/considerable before the play/backlash can be wound up by a torque applied on the input shaft. If the difference $\Delta_\omega$ is big/considerable when the play/backlash is gone/eliminated, the difference $\Delta_\omega$ results in big/considerable powertrain oscillations. Powertrain oscillations may cause vehicle speed variations, which make the vehicle rock longitudinally. These rocking movements in the vehicle are very disruptive for the driver of the vehicle.

Therefore, in some prior art solutions, strategies have been used at the request of engine torque in order to reduce these powertrain oscillations Such strategies utilise limiting torque ramps when the engine torque is requested. These torque ramps have been chosen in a way that the requested engine torque is limited such that the play/backlash is eliminated/wound up, and the powertrain oscillations are reduced. For example, the torque ramp should, according to some prior art solutions, initially be limited to being relatively flat in order not to apply too much energy into the powertrain per time unit, which would then result in powertrain oscillations.

In the fourth phase of the gear shifting operation, the engine torque is ramped up to the torque requested by the driver and/or driving assisting devices, such as vehicle speed/cruise control systems. In the fourth phase, the torque ramps used are usually steeper/less flat than in the third phase.

SUMMARY OF THE INVENTION

As described above, allowing the driver and/or, for example, a cruise control to freely request a torque would often result in considerable and disruptive powertrain oscillations. Therefore, limiting torque ramps, including a first relatively flat ramp followed by a second steeper ramp, are often used in prior art systems.

The first relatively flat torque ramp is then usually manually calibrated and does not provide any comfort feedback information, i.e. no feedback information related to powertrain oscillations is provided. Thus, it is in prior art systems not known by the control system if the used torque ramp causes oscillations or not.

In order to eliminate/wind up the play/backlash of the power train in a safe and reliable way, a small engine torque having a very precise value need to be provided for the prior art solutions. Such a high accuracy value for the small engine torque is today very hard, and often impossible, to provide. Probably, an additional high precision engine torque sensor would have to be implemented in the vehicle in order be able to provide a sufficiently accurate small engine torque value. Such an additional sensor is expensive to implement in the vehicle, especially since it has to be a high precision sensor. Also, to add another sensor adds to the hardware complexity of the vehicle.

It is therefore one objective of the present invention, to provide a method and a system for controlling a backlash of a powertrain that at least partly solve these problems.

This objective is achieved through the above-mentioned method according to the characterising portion of claim 1. The objective is also achieved through the above-mentioned system according to the characterising portion of claim 15, and the above mentioned computer program and computer program product.

According to a first aspect of the present invention, a method for controlling a backlash of a powertrain included in a vehicle in connection with a gear shifting operation is presented. The method comprises:
controlling, in connection with a first gear shifting operation, a clutch included in the powertrain to a slipping position $C_{slip}$, in which slipping position $C_{slip}$ the clutch transfers a slipping torque $T_{slip}$ being less than a torque $T_{closed}$ being transferred in a closed position $C_{closed}$ for the clutch;
analyzing a change $\dot{\omega}$ of a rotational speed $\omega$ for an input shaft of a gearbox included in the powertrain;
determining a position $C_{det}$ for the clutch, for which position $C_{det}$ the change $\dot{\omega}$ of the rotational speed has a value $\dot{\omega}_{det}$ corresponding to a backlash torque $T_{backlash}$, the backlash torque $T_{backlash}$ having a predetermined value for eliminating the backlash; and
utilizing the determined clutch position $C_{det}$ for controlling the clutch in connection with a second subsequent gear shifting operation.

According to the present invention, a substantially even and non-oscillating torque profile, or at least a torque profile having oscillations with significantly lower amplitudes than for prior art, is provided. The present invention does not result in oscillations that have a negative impact on the comfort in the vehicle. When the present invention is used, powertrain oscillations may be reduced in number and/or size for gear shifting operations, in situations where previously known control methods would have resulted in problematic rocking of the vehicle. A driver desires a soft and comfortable driving experience, and when such a comfortable driving experience is achieved, this gives a sense of the motor vehicle being a refined and well developed product.

Further, to be able to eliminate the backlash/play in a controlled manner also reduces the wear on components in the powertrain, such as e.g. the wear on cog wheels.

Also, the present invention can be implemented without the need of additional hardware components in the vehicle. For example, there is no need for an additional high precision engine torque sensor in the vehicle when the present invention is implemented. Thus, the present invention does neither add to the hardware cost nor to the hardware complexity for the vehicle.

According to an embodiment of the present invention, the clutch is controlled in connection with the second subsequent gear shifting operation to be in the determined clutch position $C_{det}$ when the gearbox is changed into a target gear position $G_{target}$. Hereby, quick and reliable gear shifting operations are achieved.

According to an embodiment of the present invention, the clutch is controlled in connection with the second subsequent gear shifting operation to be in the determined clutch position $C_{det}$ after the gearbox has been changed into a target gear position $G_{target}$.

According to an embodiment of the present invention, the gearbox is changed into the target gear position $G_{target}$ when the rotational speed $\omega$ for an input shaft is essentially equal to a target value $\omega_{e\_target}$ for a rotational speed of an engine included in the powertrain.

According to an embodiment of the present invention, the clutch is controlled to be in the determined clutch position $C_{det}$ at least initially during up-ramping of a powertrain torque $T_{powertrain}$ after the second gear changing operation.

According to an embodiment of the present invention, the controlling of the clutch is preceded by:
shifting the gearbox into a neutral gear position; and
braking the input shaft to a rotational speed value $\omega_{low}$ being lower than a target value $\omega_{e\_target}$ for a rotational speed of an engine included in the powertrain.

According to an embodiment of the present invention, the braking is effected by an input shaft brake arrangement.

According to an embodiment of the present invention, the determining of the position $C_{det}$ for the clutch is followed by verifying the eliminating of the backlash based on an analysis of a difference $\Delta$ between the rotational speed $\omega$ for the input shaft and a converted rotational wheel speed $\omega_{wheel}$, the converted rotational wheel speed $\omega_{wheel}$ being calculated based on a rotational speed of at least one driving wheel and on a total gearing ratio between the input shaft and the at least one driving wheel.

According to an embodiment of the present invention, the backlash torque $T_{backlash}$ is controlled such that the difference $\Delta$ is less than a predetermined value $\Delta_{predet}$; $\Delta<\Delta_{predet}$; during the eliminating of the backlash.

According to an embodiment of the present invention, the position $C_{det}$ for the clutch corresponds to a position $C_{act}$ for a clutch actuator controlling a degree of opening for the clutch.

According to an embodiment of the present invention, the determined value $\dot{\omega}_{det}$ for the change in rotational speed is dependent on a rotational inertia $J$ of one or more parts of the clutch and the gearbox.

According to an embodiment of the present invention, the predetermined value of the backlash torque $T_{backlash}$ is within a range of 10-50 Nm, or within a range of 15-25 Nm, or approximately 20 Nm.

According to an aspect of the present invention, a system arranged for controlling a backlash of a powertrain included in a vehicle in connection with a gear shifting operation is presented. The system includes:
a clutch control unit, arranged for controlling, in connection with a first gear shifting operation, a clutch included in the powertrain to a slipping position $C_{slip}$, in which slipping position $C_{slip}$ the clutch transfers a slipping torque $T_{slip}$ being less than a torque $T_{closed}$ being transferred in a closed position $C_{closed}$ for the clutch;
an analysis unit, arranged for analyzing a change $\dot{\omega}$ of a rotational speed $\omega$ for an input shaft of a gearbox included in the powertrain;
a determination unit, arranged for determining a position $C_{det}$ for the clutch, for which position $C_{det}$ the change $\dot{\omega}$ of the rotational speed has a value $\dot{\omega}_{det}$ corresponding to a backlash torque $T_{backlash}$, the backlash torque $T_{backlash}$ having a predetermined value suitable for eliminating the backlash; and
the clutch control unit, arranged for utilizing the determined clutch position $C_{det}$ for controlling the clutch in connection with a second subsequent gear shifting operation.

According to an embodiment of the present invention, the clutch control unit is configured to control the clutch in connection with the second subsequent gear shifting operation to be in the determined clutch position $C_{det}$ when the gearbox is changed into a target gear position $G_{target}$.

According to an embodiment of the present invention, the clutch control unit is configured to control the clutch in connection with the second subsequent gear shifting operation to be in the determined clutch position $C_{det}$ after the gearbox has been changed into a target gear position $G_{target}$.

According to an embodiment of the present invention, a gearbox control unit is configured to control the gearbox to be changed into the target gear position $G_{target}$ when the rotational speed $\omega$ for an input shaft is essentially equal to a target value $\omega_{e\_target}$ for a rotational speed of an engine included in the powertrain.

According to an embodiment of the present invention, the clutch control unit is configured to control the clutch to be in the determined clutch position $C_{det}$ at least initially during up-ramping of a powertrain torque $T_{powertrain}$ after the second gear changing operation.

According to an embodiment of the present invention, before the clutch control unit controls the clutch to the slipping position, the gearbox control unit is configured to shift the gearbox into a neutral gear position, and a braking control unit is configured to brake the input shaft to a rotational speed value $\omega_{low}$ being lower than a target value $\omega_{e\_target}$ for a rotational speed of an engine included in the powertrain.

According to an embodiment of the present invention, an input shaft brake arrangement is configured to effect the braking.

According to an embodiment of the present invention, a verification unit is configured to verify the eliminating of the backlash based on an analysis of a difference $\Delta$ between the rotational speed $\omega$ for the input shaft and a converted rotational wheel speed $\omega_{wheel}$, after the determining of the position $C_{det}$ for the clutch, the verification unit being configured to calculate the converted rotational wheel speed $\omega_{wheel}$ based on a rotational speed of at least one driving wheel and on a total gearing ratio between the input shaft and the at least one driving wheel.

According to an embodiment of the present invention, a clutch control unit is configured to control the backlash torque $T_{backlash}$ such that the difference $\Delta$ is less than a predetermined value $\Delta_{predet}$; $\Delta < \Delta_{predet}$; during the eliminating of the backlash.

According to an embodiment of the present invention, the position $C_{det}$ for the clutch corresponds to a position $C_{act}$ for a clutch actuator controlling a degree of opening for the clutch.

According to an embodiment of the present invention, the determined value $\dot{\omega}_{det}$ for the change in rotational speed is dependent on a rotational inertia J of one or more parts of the clutch and the gearbox.

According to an embodiment of the present invention, the predetermined value of the backlash torque $T_{backlash}$ is within a range of 10-50 Nm, or within a range of 15-25 Nm, or approximately 20 Nm.

According to an aspect of the present invention, a vehicle including a system as described herein and arranged for controlling a backlash of a powertrain included in the vehicle in connection with a gear shifting operation is presented.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 1:
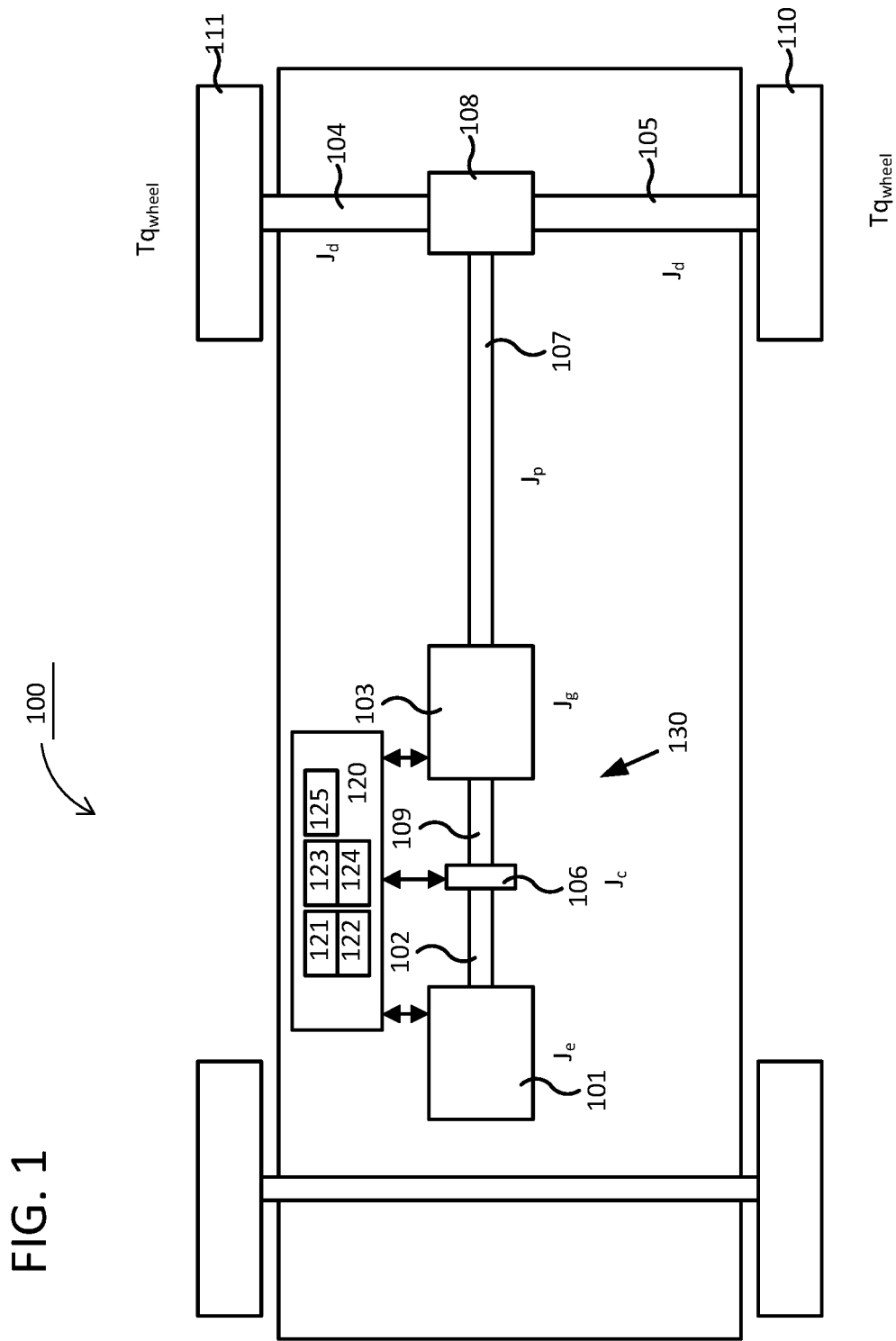
FIG. 1 shows an example vehicle, in which the present invention may be implemented.

FIG. 1 schematically shows a heavy example vehicle 100, such as a truck, a bus or similar, which will be used to explain the present invention. The present invention is, however, not limited to use in heavy goods vehicles as the one shown in FIG. 1, but may also be used in lighter vehicles such as passenger cars. The vehicle 100, shown schematically in FIG. 1, comprises a pair of driving wheels 110, 111. The vehicle furthermore comprises a powertrain 130 with an engine 101, which may be, for example, a combustion engine, an electrical motor or a combination of these, a so called hybrid drive. The engine 101 may, for example, in a customary fashion, via an output shaft 102 of the engine 101, be connected with a gearbox 103, via a clutch 106 and an input shaft 109 connected to the gearbox 103. An output shaft 107 from the gearbox 103, also known as a propeller shaft, drives the driving wheels 110, 111 via a final gear 108, such as e.g. a customary differential, and drive shafts 104, 105 connected with said final gear 108.

A control unit 120 is in FIG. 1 schematically illustrated as receiving signals and/or providing control signals from and/or to the engine 101, the clutch 106 and/or the gearbox 103. As described below, the control unit 120 may comprise a clutch control unit 121, an analysis unit 122, and a determination unit 123. According to some embodiments of the present invention, the control device 120 may also comprise a gearbox control unit 124, a brake control unit 125 and/or a verification unit 125. These units are described in more detail below.

Figure 2:
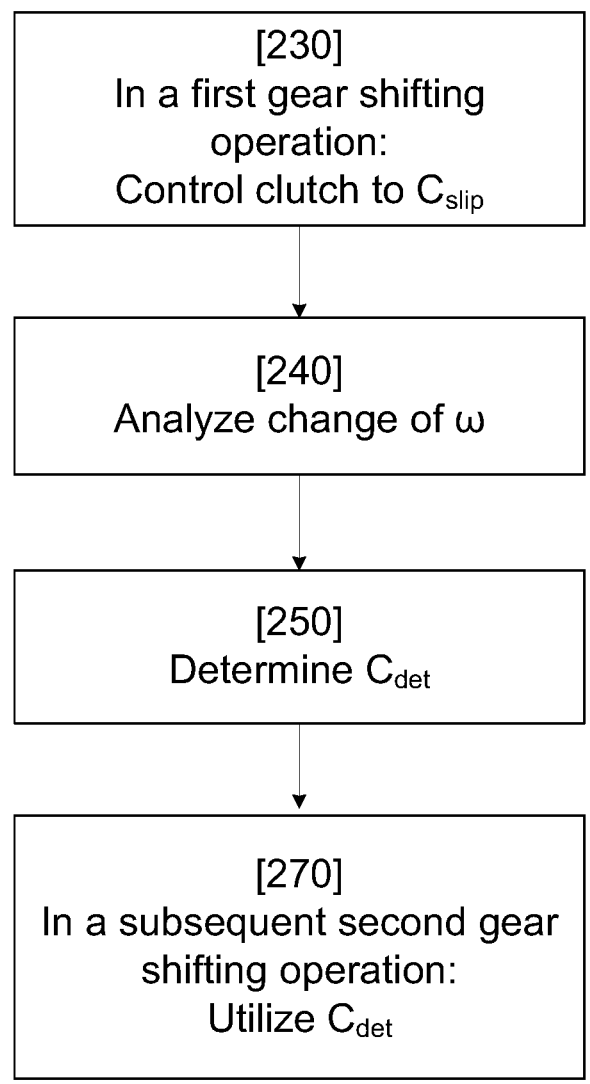
FIG. 2 shows a flow chart for a method according to an embodiment of the present the invention, FIGS. 3a-c schematically illustrate a play in the powertrain.

FIG. 2 shows a flow chart for a method for controlling a backlash of a powertrain included in a vehicle 100 in connection with a gear shifting operation, according to an embodiment of the present invention.

In a third step 230, a clutch 106 included in the powertrain 130 is controlled in connection with a first gear shifting operation. As is described below, a first step 210 and/or a second step 220 may precede the third step 230 according to some embodiments.

The clutch 106 is in the third step 230 controlled to a slipping position $C_{slip}$, in which slipping position $C_{slip}$ the clutch 106 transfers a slipping torque $T_{slip}$ being less than a torque $T_{closed}$ being transferred in a closed position $C_{closed}$ for the clutch 106. Thus, in the slipping position $C_{slip}$, the clutch 106, i.e. a clutch actuator controlling the position of the clutch, is in a position between a closed position $C_{closed}$ and an open position $C_{open}$, whereby the slipping torque $T_{slip}$ is lower than a closed torque $T_{closed}$ and higher than an open torque $T_{open}$ being transferred by the clutch 106 in the closed position $C_{closed}$ and in the open position $C_{open}$, respectively; $T_{open} < T_{slip} < T_{closed}$.

In a fourth step 240, a change $\dot{\omega}$ of a rotational speed $\omega$ for an input shaft 109 of the gearbox 103 included in the powertrain 130 is analysed. This analysis will be described more in detail below.

In a fifth step 250, a position $C_{det}$ for the clutch 106 is determined, such that the change $\dot{\omega}$ of the rotational speed has a value $\dot{\omega}_{det}$ corresponding to a backlash torque $T_{backlash}$ for that position $C_{det}$. The backlash torque $T_{backlash}$ has here a predetermined value being suitable for eliminating the backlash in the powertrain, as will be described below.

In a seventh step 270, the determined clutch position $C_{det}$ is utilised for controlling the clutch 106 in connection with a second subsequent gear shifting operation. As is described below, a sixth step 260 may precede the seventh step in some embodiments.

Thus, according to the present invention, the position $C_{det}$ for the clutch 106, which in connection with a first gear shifting operation has been determined to be suitable for eliminating the powertrain backlash/play, is utilised 270 in a second subsequent gear shifting operation for eliminating the powertrain backlash/play. Hereby, the powertrain oscillations and/or the component wear may be reduced considerably in connection with the second subsequent gear shifting operation. The reduction in powertrain oscillations increases the driver comfort in the vehicle.

By the use of the present invention, a more efficient and reliable elimination of potential backlash/play in the powertrain is achieved. Therefore, also quick and reliable gear changing operations are achieved. As described above, play/backlash in the powertrain may, for example, arise when two cogs in the powertrain, such as for example the cogs in two cogwheels in the gearbox, fail to engage/mesh with each other.

Figure 3A:
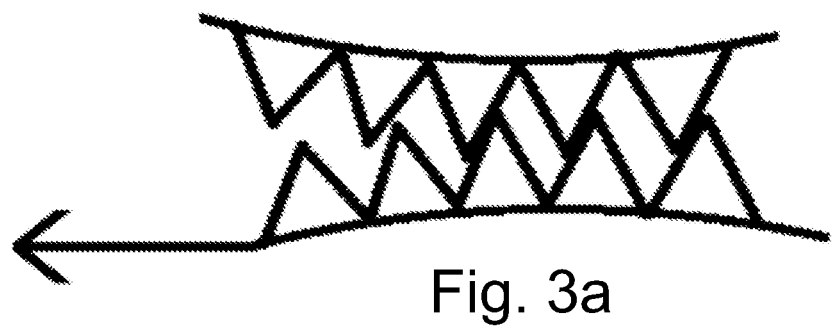
Figure 3B:
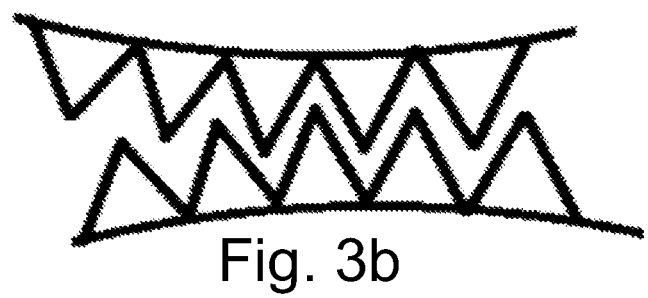
Figure 3C:
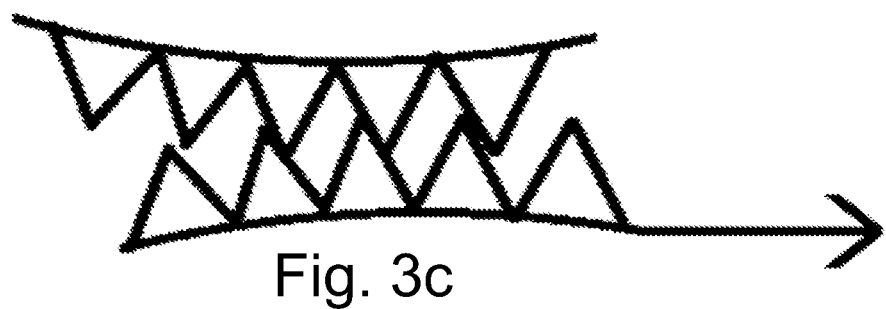

The position of the cogwheels in relation to each other during and outside of the play is schematically illustrated in the FIGS. 3a-c. The cogs of the cogwheels make contact in a first shaft position, during rotation in a first direction, as illustrated in FIG. 3a, in a position corresponding to a maximum backward turn. The cogs in the cogwheels also make contact in a third shaft position, during rotation in a second direction, as illustrated in FIG. 3c, in a position corresponding to a maximum forward turn. Therefore, the cogs are engaged/meshed in both these positions (illustrated in FIGS. 3a and 3c respectively), which also means that the play is rotated backwards and forwards respectively. The play in the powertrain is made up of the rotation angle when the cogs are not engaged/meshed with each other, that is to say the angle range between the first and third shaft positions, corresponding to a second position within the play, illustrated in FIG. 3b. Thus, no torque is transmitted during the play, since the cogs do not engage with each other in this second gear/position. It should be noted that FIGS. 3a-c illustrate, in a schematic and simplified manner, a play between only two cogwheels, and that a powertrain may comprise connections between more than two cogwheels, as described above. However, FIGS. 3a-c may be used to explain, in principle, the occurrence of a play.

A backlash/play may thus, for example, occur at a transition between dragging the engine and an acceleration/torque request when engaging the clutch, or during a shift operation. Since an efficient elimination/winding up of such a play may be provided by the use of the present invention, a rapid torque build-up may be obtained.

Figure 4:
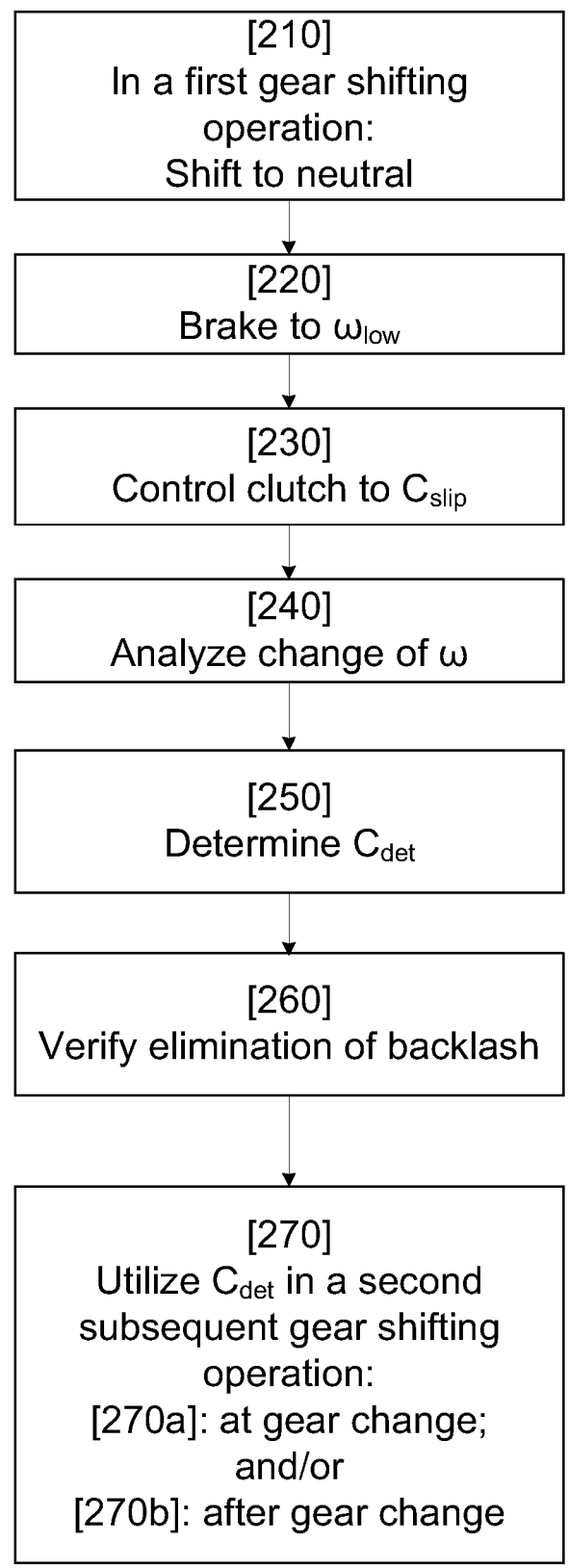
FIG. 4 shows a flow chart for a method according to an embodiment of the present the invention.

FIG. 4 shows a flow chart illustrating different embodiments of the present invention including a number of steps being performed in connection with a gear shifting operation, that will hereafter be described. FIGS. 5a-d schematically illustrates a non-limiting example of a first and a second gear shifting operations, that are here used for explaining the principles of the embodiments descried in this document.

In FIG. 4, the third 230, the fourth 240, the fifth 250 and the seventh 270 steps correspond to the steps described above in connection with FIG. 2. These steps are only briefly described here, and reference is made to FIG. 2. In addition to these previously described steps, a number of further steps are described in connection with FIG. 4 and exemplified by the non-limiting first gear shifting operation illustrated in FIGS. 5a-d.

As is illustrated in FIGS. 5a-d, the clutch 106 is in a first gear shifting operation controlled 531 to be opened 532, i.e. is controlled to an open position $C_{open}$, after which the gearbox 103 is shifted 521 into a neutral gear $G_{neutral}$. After the gearbox 103 is shifted into a neutral gear $G_{neutral}$, the target value $\omega_{e\_target}$ 540 for a rotational speed $\omega_e$ of the engine 101 (solid line in FIG. 5b) is reduced from a higher value 501 to a lower value 502. The target value $\omega_{e\_target}$ 540 for the rotational speed $\omega_e$ of the engine 101 can be calculated based on the rotational speed of the wheels $\omega_{drive\_wheel}$ and the total target gear ratio $g_{powertrain\_target}$ for the powertrain/driveline from the input shaft 109 to the drive wheels 110, 111.

Figure 5:
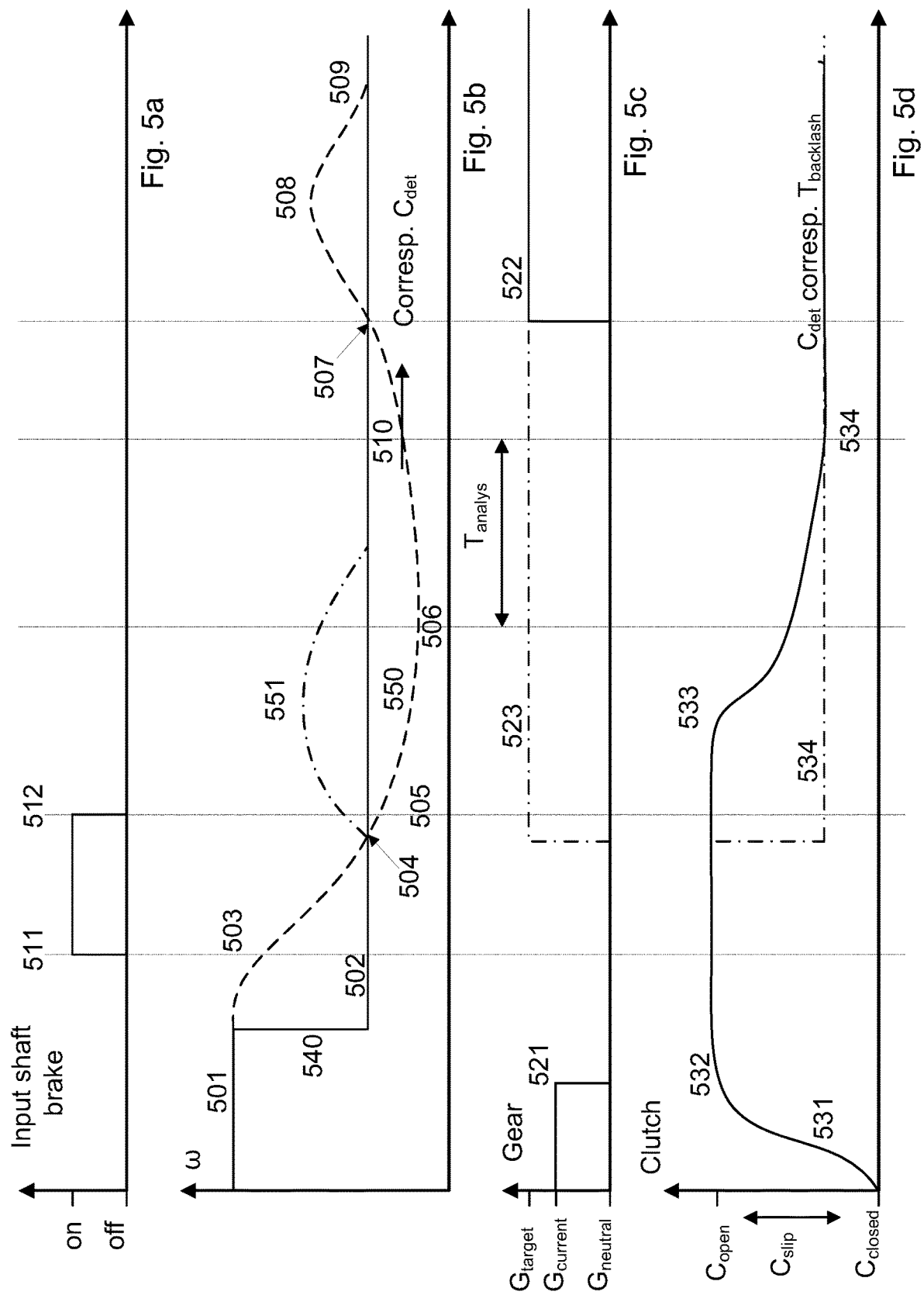
FIGS. 5a-d show a non-limiting gear shifting operation, used for explaining various embodiments of the present invention.

When the target value $\omega_{e\_target}$ 540 is reduced to its lower value 502, the rotational speed $\omega$ 550 for the input shaft 109 of the gearbox 103 (550; dashed line in FIG. 5b) is also reduced. The dashed line for the rotational speed $\omega$ 550 for the input shaft 109 in FIG. 5b represents the rotational speed $\omega$ in connection with the first gear shifting operation. According to an embodiment of the present invention, an input shaft brake arrangement providing a braking torque directly or indirectly on the input shaft 109 is activated 511 in order to brake the rotational speed to a value $\omega_{low}$ being lower than the target value $\omega_{e\_target}$ 540.

Figure 7:
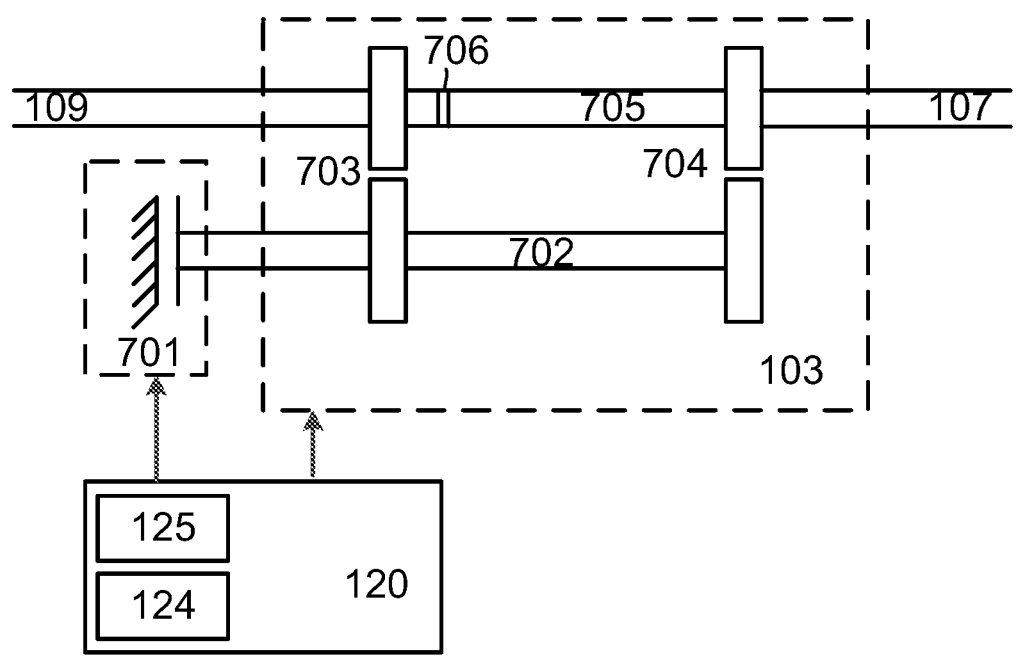

The input shaft brake arrangement can be arranged in a number of ways, as long as a braking torque is applied to the input shaft 109. The braking torque can according to different embodiments be applied directly to the input shaft 109 and/or to another shaft 702 being connected to the input shaft via at least one gear wheel meshing. FIG. 7 schematically illustrates one example of a gearbox 103 including an input shaft 109, and a main/transmission shaft 705 being journaled to the input shaft 109 in bearings 706. Also, a lay shaft brake 701, configured to apply a braking torque to a lay shaft 702, is schematically illustrated. The lay shaft 702 is here braked by the lay shaft brake 701, and the braking force is then provided to the input shaft 109 of the gearbox 103 via one or more gear wheel meshes 703, 704. The input shaft brake arrangement may be constructed in a number of ways, and is not limited to the schematic illustration of FIG. 7. As described in this document, the input shaft brake arrangement may be controlled by a brake control unit 125 included in a control unit 120. The control unit 120 may also include a gearbox control unit 124.

This is also illustrated in a first step 210 and a second step 220 in FIG. 4. Thus, in the first step 210, the gearbox 103 is shifted into a neutral gear position. Also, in the second step 220, the input shaft 109 of the gearbox 103 is braked to a rotational speed 550 having a value $\omega_{low}$ being lower than the target value $\omega_{e\_target}$ for the rotational speed of the engine 101. Thus, the rotational speed value $\omega$ 550 of the input shaft 109 for the first gear shifting operation (dashed line) is braked passed the target value $\omega_{e\_target}$ 504 until the input shaft braking arrangement is deactivated 512 when the rotational speed value $\omega$ 550 is lower than the target value $\omega_{e\_target}$ 505.

As described above, the clutch 106 is then controlled 533 in a third step 230 to the slipping position $C_{slip}$ from the open position $C_{open}$. In this document, the positions for the clutch 106, such as the open position $C_{open}$, the closed position $C_{closed}$, the slipping position $C_{slip}$ and the determined position $C_{det}$, each corresponds to a position $C_{act}$ of a clutch actuator controlling a degree of opening for said clutch 106. Thus, the position of the clutch/actuator determines the torque being transferred by the clutch 106.

The deactivation of the input shaft braking arrangement in combination with the use of the slipping position $C_{slip}$ of the clutch 106 causes the rotational speed $\omega$ 550 for the input shaft 109 to increase again after its lowest value 506. Thus, the rotational speed $\omega$ 550 for the input shaft 109 increases such that a change $\dot{\omega}$ of the rotational speed $\omega$ 550 is provided. This change $\dot{\omega}$ of the rotational speed is then in a fourth step 240 analysed during an analysis time period $T_{analysis}$. This analysis will be described more in detail below.

The analysis of the change $\dot{\omega}$ of the rotational speed can then in a fifth step 250, be used for determining a position $C_{det}$ for the clutch 106 for which the acceleration/change/derivative $\dot{\omega}$ of the rotational speed has a value $\dot{\omega}_{det}$ corresponding to a backlash torque $T_{backlash}$ for that position $C_{det}$. The position $C_{det}$ can here be determined such that the backlash torque $T_{backlash}$ corresponding to the value $\dot{\omega}_{det}$ has a predetermined value being suitable for eliminating the backlash in the powertrain.

As is illustrated in FIG. 1, the different parts of the powertrain have different rotational inertias, comprising a rotational inertia $J_e$ for the engine 101, a rotational inertia $J_g$ for the gearbox 103, a rotational inertia $J_c$ for the clutch 106, a rotational inertia $J_p$ for the propeller shaft 107 and rotational inertias $J_d$ for each drive shaft 104, 105. Generally speaking, all rotating bodies have a rotational inertia $J$, which depends on the mass of the body and the distance of the mass from the rotational centre. For reasons of clarity, in FIG. 1, only the above mentioned rotational inertias have been added, and their significance for the present invention will be described hereafter. A person skilled in the art does, however, realize that more moments of inertia may occur in a powertrain than those listed here.

Generally, the torque T and the change $\dot{\omega}$ of the rotational speed are related to each other and to a rotational inertia J according to $T=J\dot{\omega}$. For the powertrain, or at least for parts of the powertrain, the rotational inertia J is known or can be calculated.

The determined value $\dot{\omega}_{det}$ for the change in rotational speed is dependent at least on a rotational inertia J of one or more parts of the clutch 106 and the gearbox 103. One non-limiting example value for the inertia J for the rotating parts of the clutch 106 and the gearbox 103 can be e.g. 0.5 kg*m². According to an embodiment of the present invention, the predetermined value of the backlash torque $T_{backlash}$ suitable for eliminating the backlash/play may be empirically determined and may have a value exceeding at least the frictional torques of the gearbox and the drive shafts 104, 105, for example within a range of 10-50 Nm, or within a range of 15-25 Nm, or approximately 20 Nm.

Thus, the value $\dot{\omega}_{det}$ for the acceleration/change/derivative $\dot{\omega}$ of the rotational speed corresponding to the backlash torque $T_{backlash}$ value being useable for eliminating the backlash/play is calculated. Then, the clutch 103 is controlled to be gradually more and more closed from its open position $C_{open}$ 533 (solid line for the first shifting operation in FIG. 5d). During the analysis time period $T_{analysis}$, the clutch is gradually closed until the wanted value $\dot{\omega}_{et}$ for the acceleration/change/derivative $\dot{\omega}$ results 534 from the control of the clutch. As described above, when the acceleration/change/derivative $\dot{\omega}$ has this wanted value $\dot{\omega}_{det}$ 510, the backlash torque $T_{backlash}$ is provided to the powertrain, which eliminates/winds up the backlash/play. In the fifth step 250, the position $C_{det}$ for the clutch 103 which results in the wanted value $\dot{\omega}_{det}$, and thus also in the backlash torque $T_{backlash}$, is determined based on the actual position of the clutch 103 when the wanted value $\dot{\omega}_{det}$ is provided.

The rotational speed $\omega$ 550 of the input shaft 109 then continues to increase, such that it reaches 507 the target value $\omega_{e\_target}$ 540 for the rotational speed of the engine 101 again. The gearbox 103 is changed into a target gear position $G_{target}$ 522 (solid line for the first gear shifting operation in FIG. 5c) when the rotational speed $\omega$ for the input shaft 109 is essentially equal 507, e.g. within an interval of ±40 rpm, with the target value $\omega_{e\_target}$ for the rotational speed of the engine 101.

When the rotational speed $\omega$ 550 of the input shaft 109 has increased above the target value $\omega_{e\_target}$ 502/540 for the rotational speed of the engine 101, the backlash/play is eliminated 508 and the rotational speed $\omega$ is reduced to the target value $\omega_{e\_target}$ 502/540 again 509.

In a sixth step 260 of the method, the elimination of the backlash is verified based on an analysis of a difference $\Delta$ between the rotational speed $\omega$ 550 for the input shaft 109 and a converted rotational wheel speed $\omega_{wheel}$. The converted rotational wheel speed $\omega_{wheel}$ can here be calculated based on a rotational speed of at least one driving wheel 110, 111 in the vehicle 100 and on a total gearing ratio between the input shaft 109 of the gearbox 103 and the at least one driving wheel 110, 111, e.g. including at least the gearing ratio of the gearbox and the differential 108.

According to an embodiment of the present invention, the backlash torque $T_{backlash}$ is controlled such that the difference $\Delta$ is less than a predetermined value $\Delta_{predet}$; $\Delta<\Delta_{predet}$; during the elimination of the backlash. Here, a constant and/or predetermined value for the backlash torque $T_{backlash}$ can be requested/provided during the backlash elimination process, which results in a value for the difference $\Delta$. The difference $\Delta$ is then analysed in order to determine if the backlash/play has been eliminated or not. Alternatively, the value for the backlash torque $T_{backlash}$ is adapted in order to achieve the predetermined value $\Delta_{predet}$ for the difference $\Delta$. For the embodiments mentioned herein, the predetermined value $\Delta_{predet}$ can be e.g. 10 rotations per minute; i.e. $\Delta_{predet}$=10 rpm and $\Delta<10$ rpm. Hereby, a controlled elimination of the backlash/play is achieved.

As described above, the first to sixth steps 210, 220, 230, 240, 250, 260 are performed in connection with the first gear shifting operation. By these steps, the position $C_{det}$ for the clutch 103 being suitable for eliminating the backlash in the powertrain can be determined in connection with the first gear shifting operation.

In a seventh step 270, the determined clutch position $C_{det}$ is utilised for controlling the clutch 106 in connection with a second subsequent gear shifting operation. Thus, the clutch position $C_{det}$ having been determined in connection with the first gear shifting operation can then be used later in connection with a second gear shifting operation, as is illustrated with the dot-dashed line 534 in FIG. 5d.

The dot-dashed line 551 for the rotational speed ω for the input shaft 109 in FIG. 5b illustrates the rotational speed ω 551 for the second subsequent gear shifting operation. Also, the dot-dashed line 523 for the gears in FIG. 5c illustrates the gearing in connection with the subsequent second gear shifting operation. As is clearly illustrated in FIGS. 5b-c, the target gear $G_{target}$ can be engaged already 504 when the rotational speed ω for the input shaft 551 has a value being essentially equal to the target value $ω_{e\_target}$ 502/540 for the rotational speed of the engine 101. Also, the rotational speed ω 551 for the second subsequent gear shifting operation can be directly increased 504 when the rotational speed ω for the input shaft has a value being essentially equal to the target value $ω_{e\_target}$ 502/540, e.g. within an interval of ±40 rpm around the target value $ω_{e\_target}$ 502/540.

Thus, a quick and safe gear shifting operation, without driveline oscillations can be provided by the present invention, after the above described steps in connection with the first gear shifting operation have been performed. In other words, the first gear shifting operation will according to the present invention, take a little more time than a standard gear shifting operation, but after that, quick and comfortable gear shifting operations are provided according to the present invention. The first gear shifting operation can for example be performed in a driving situation in which there is plenty of time to perform the gear shifting operation, and to determine the clutch position $C_{det}$ to be used in one or more upcoming gear shifting operations after the first gear shifting operation.

The clutch 106 is, according to an embodiment, controlled 270a to be in the determined clutch position $C_{det}$ when the gearbox 103 is changed into the target gear position $G_{target}$ in connection with the second subsequent gear shifting operation, as is illustrated by the dot-dashed line 534 in FIG. 5d. Thus, the determined clutch position $C_{det}$ is here used when the gear wheels and/or shafts in the gearbox 103 corresponding to the target gear position $G_{target}$ engage with each other.

According to an embodiment, the clutch 106 is controlled 270b to be in the determined clutch position $C_{det}$ after the gearbox 103 has been changed into a target gear position $G_{target}$ in connection with the second subsequent gear shifting operation, e.g. at least initially during up-ramping of a powertrain torque $T_{powertrain}$ after the second gear changing operation.

According to an embodiment, the clutch 106 is controlled 270a to be in the determined clutch position $C_{det}$ when the gearbox 103 is changed into the target gear position $G_{target}$, and is also kept in this position thereafter, e.g. during the up-ramping.

In this document, the closed clutch position $C_{closed}$ may be defined as the clutch being closed and no longer slipping, which also means that the rotational speeds for the clutch's input 102 and output 109 shafts are substantially equal. This may also be expressed as the clutch at this clutch position $C_{closed}$ is able to transfer a higher torque than an actual/momentary torque that is transferred to the input shaft 109 and/or to the driving wheels at a time instant.

When the clutch 106 is in the slipping clutch position $C_{slip}$, the clutch can according to an embodiment transmit a slip torque, which has a permitted and suitable value to wind up the play of the powertrain and/or to prepare the powertrain for the future torque increase/ramp. This may also be expressed as the powertrain is wound up when the clutch 106 is in the slipping clutch position $C_{slip}$.

Control/Activation of the clutch is usually carried out with the use of one or more actuators. These actuators may for example be hydraulic, pneumatic and/or electrically driven/activated/controlled.

According to an aspect of the present invention, a system for controlling a backlash of a powertrain 130 included in a vehicle 100 in connection with a gear shifting operation is presented.

With reference to FIGS. 1 and 5b-d, the system includes a clutch control unit 121, arranged for controlling 230, in connection with a first gear shifting operation, a clutch 106 included in the powertrain 130 to a slipping position $C_{slip}$, in which slipping position $C_{slip}$ the clutch 106 transfers a slipping torque $T_{slip}$ being less than a torque $T_{closed}$ being transferred in a closed position $C_{closed}$ for the clutch.

The system also includes an analysis unit 122, arranged for analyzing 240 a change of a rotational speed ω for an input shaft 109 of a gearbox 103 included in the powertrain 130.

The system also includes a determination unit 123, arranged for determining 250 a position $C_{det}$ for the clutch 106, for which position $C_{det}$ the change ω of the rotational speed has a value $ω_{det}$ corresponding to a backlash torque $T_{backlash}$, the backlash torque $T_{backlash}$ having a predetermined value suitable for eliminating the backlash.

The clutch control unit 121 is further arranged for utilizing 270 the determined clutch position $C_{det}$ for controlling the clutch 106 in connection with a second subsequent gear shifting operation.

The system according to the present invention can be arranged for performing all of the above, in the claims, and in the herein described embodiments method steps. The system is hereby provided with the above described advantages for each respective embodiment. The present invention is also related to a vehicle 100, such as a truck, a bus or a car, including the herein described system for controlling a backlash of a powertrain.

The person skilled in the art will appreciate that a method for controlling a backlash of a powertrain according to the present invention can also be implemented in a computer program, which, when it is executed in a computer, instructs the computer to execute the method. The computer program is usually constituted by a computer program product 603 stored on a non-transitory/non-volatile digital storage medium, in which the computer program is incorporated in the computer-readable medium of the computer program product. Said computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

Figure 6:
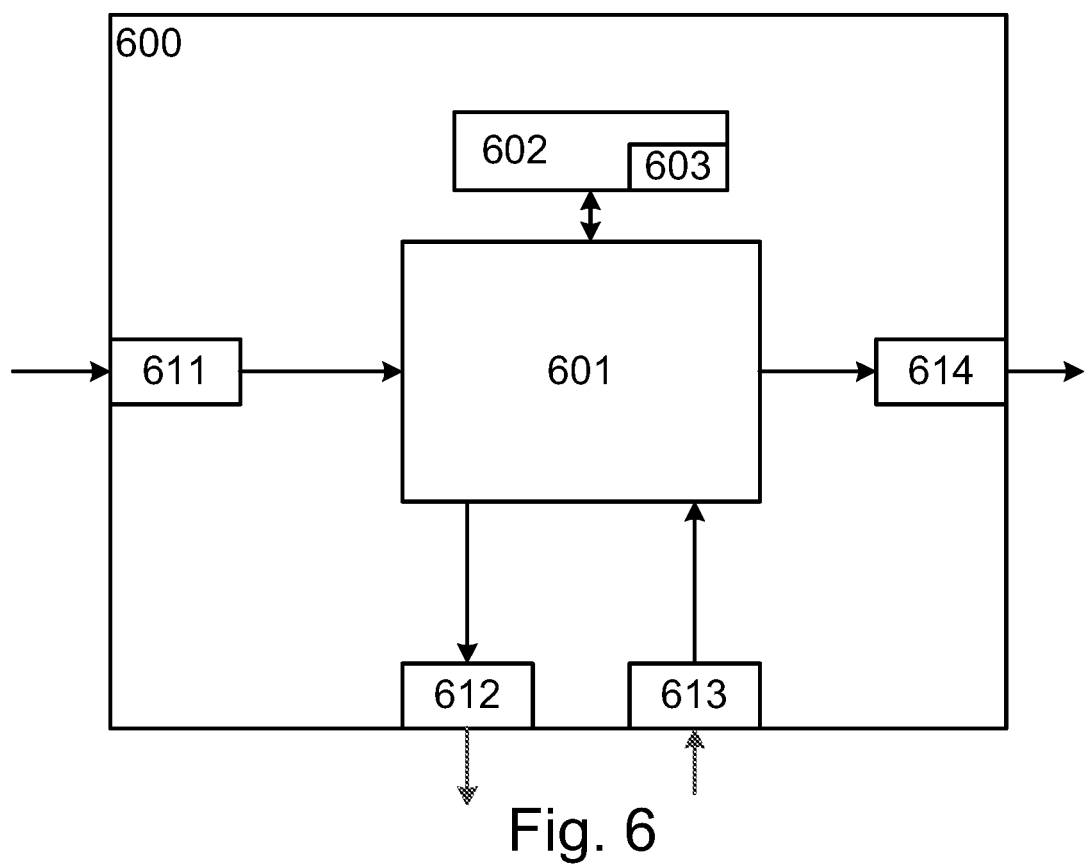
FIG. 6 shows a control device, in which a method according to the present invention may be implemented, and FIG. 7 schematically shows an input shaft brake arrangement according to an embodiment.

FIG. 6 shows in schematic representation a control unit 600. The control unit 600 comprises a computing unit 601, which can be constituted by essentially any suitable type of processor or microcomputer, for example a circuit for digital signal processing (Digital Signal Processor, DSP), or a circuit having a predetermined specific function (Application Specific Integrated Circuit, ASIC). The computing unit 601 is connected to a memory unit 602 arranged in the control unit 600, which memory unit provides the computing unit 601 with, for example, the stored program code and/or the stored data which the computing unit 601 requires to be able to perform computations. The computing unit 601 is also arranged to store partial or final results of computations in the memory unit 602.

In addition, the control unit 600 is provided with devices 611, 612, 613, 614 for receiving and transmitting input and output signals. These input and output signals can contain waveforms, impulses, or other attributes which, by the devices 611, 613 for the reception of input signals, can be detected as information and can be converted into signals which can be processed by the computing unit 601. These signals are then made available to the computing unit 601. The devices 612, 614 for the transmission of output signals are arranged to convert signals received from the computing unit 601 in order to create output signals by, for example, modulating the signals, which can be transmitted to other parts of and/or systems in the vehicle.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing unit 601 and that the above-stated memory can be constituted by the memory unit 602.

Control systems in modern vehicles commonly comprise communication bus systems consisting of one or more communication buses for linking a number of electronic control units (ECU's), or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1, 6 and 7, which is well known to the person skilled in the art within this technical field.

In the shown embodiment, the present invention is implemented in the control unit 120. The invention can also, however, be implemented wholly or partially in one or more other control units already present in the vehicle, or in some control unit dedicated to the present invention.

Here and in this document, units are often described as being arranged for performing steps of the method according to the invention. This also includes that the units are designed to and/or configured to perform these method steps.

The at least one control unit 120 is in FIG. 1 illustrated as including separately illustrated units 121, 122, 123, 124, 125. These units 121, 122, 123, 124, 125 can, however, be logically separated by physically implemented in the same unit, or can be both logically and physically arranged together. These units 121, 122, 123, 124, 125 can for example correspond to groups of instructions, which can be in the form of programming code, that are input into, and are utilized by a processor/computing unit 601 when the units are active and/or are utilized for performing its method step, respectively.

The present invention is not limited to the above described embodiments. Instead, the present invention relates to, and encompasses all different embodiments being included within the scope of the independent claims.

The invention claimed is:

1. A method for controlling a backlash of a powertrain included in a vehicle in connection with a gear shifting operation, said method comprising:
controlling, in connection with a first gear shifting operation, a clutch included in said powertrain to a slipping position, in which slipping position said clutch transfers a slipping torque that is less than a torque being transferred in a closed position for said clutch;
analyzing a change of a rotational speed for an input shaft of a gearbox included in said powertrain;
determining a position for said clutch, for which position said change of said rotational speed has a value corresponding to a backlash torque, said backlash torque having a predetermined value for eliminating said backlash; and
utilizing said determined clutch position for controlling said clutch in connection with a second subsequent gear shifting operation.

2. A method as claimed in claim 1, wherein said clutch in connection with said second subsequent gear shifting operation is controlled to be in said determined clutch position when said gearbox is changed into a target gear position.

3. A method as claimed in claim 1, wherein said clutch in connection with said second subsequent gear shifting operation is controlled to be in said determined clutch position after said gearbox has been changed into a target gear position.

4. A method as claimed in claim 2, wherein said gearbox is changed into said target gear position when said rotational speed for an input shaft is essentially equal to a target value for a rotational speed of an engine included in said powertrain.

5. A method as claimed in claim 2, wherein said clutch is controlled to be in said determined clutch position at least initially during up-ramping of a powertrain torque after said second gear changing operation.

6. A method as claimed in claim 1, wherein said controlling of said clutch is preceded by:
shifting said gearbox into a neutral gear position; and
braking said input shaft to a rotational speed value being lower than a target value for a rotational speed of an engine included in said powertrain.

7. A method as claimed in claim 6, wherein said braking is effected by an input shaft brake arrangement.

8. A method as claimed in claim 1, wherein said determining of said position for said clutch is followed by verifying said eliminating of said backlash based on an analysis of a difference between said rotational speed for said input shaft and a converted rotational wheel speed, said converted rotational wheel speed being calculated based on a rotational speed of at least one driving wheel and on a total gearing ratio between said input shaft and said at least one driving wheel.

9. A method as claimed in claim 8, wherein said backlash torque is controlled such that said difference is less than a predetermined value during said eliminating of said backlash.

10. A method as claimed in claim 1, wherein said position for said clutch corresponds to a position for a clutch actuator controlling a degree of opening for said clutch.

11. A method as claimed in claim 1, wherein said value for said change in rotational speed is dependent on a rotational inertia of one or more parts of said clutch and said gearbox.

12. A method as claimed in claim 1, wherein said predetermined value of said backlash torque is within a range of 10-50 Nm.

13. A computer program product comprising computer program code stored on a non-transitory a computer readable medium, said computer program product for controlling a backlash of a powertrain included in a vehicle in connection with a gear shifting operation, said computer program product comprising computer instructions to cause said at least one control unit to perform the following operations:
controlling, in connection with a first gear shifting operation, a clutch included in said powertrain to a slipping position, in which slipping position said clutch transfers a slipping torque that is less than a torque being transferred in a closed position for said clutch;

analyzing a change of a rotational speed for an input shaft of a gearbox included in said powertrain;

determining a position for said clutch, for which position said change of said rotational speed has a value corresponding to a backlash torque, said backlash torque having a predetermined value for eliminating said backlash; and utilizing said determined clutch position for controlling said clutch in connection with a second subsequent gear shifting operation.

14. A system for controlling a backlash of a powertrain included in a vehicle in connection with a gear shifting operation, said system comprising:

a clutch control unit, arranged for controlling, in connection with a first gear shifting operation, a clutch included in said powertrain to a slipping position, in which slipping position said clutch transfers a slipping torque that is less than a torque being transferred in a closed position for said clutch;

an analysis unit, arranged for analyzing a change of a rotational speed for an input shaft of a gearbox included in said powertrain; and a determination unit arranged for determining a position for said clutch, for which position said change of said rotational speed has a value corresponding to a backlash torque, said backlash torque having a predetermined value suitable for eliminating said backlash, wherein said clutch control unit, arranged for utilizing said determined clutch position for controlling said clutch in connection with a second subsequent gear shifting operation.

* * * * *